US012057131B2

(12) United States Patent
Miner (10) Patent No.: US 12,057,131 B2
(45) Date of Patent: *Aug. 6, 2024

(54) DEEP LEARNING SEGMENTATION OF AUDIO USING MAGNITUDE SPECTROGRAM

(71) Applicant: Audioshake, Inc., San Francisco, CA (US)

(72) Inventor: Luke Miner, San Francisco, CA (US)

(73) Assignee: AUDIOSHAKE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,418

(22) Filed: May 6, 2022

(65) Prior Publication Data

US 2022/0262375 A1 Aug. 18, 2022

Related U.S. Application Data

(63) Continuation of application No. 17/062,253, filed on Oct. 2, 2020, now Pat. No. 11,355,134, which is a continuation of application No. 17/061,799, filed on Oct. 2, 2020, now Pat. No. 11,521,630.

(60) Provisional application No. 62/882,317, filed on Aug. 2, 2019.

(51) Int. Cl.
*G10L 19/02* (2013.01)
*G06N 3/08* (2023.01)
*G10L 21/0272* (2013.01)
*G10L 25/30* (2013.01)

(52) U.S. Cl.
CPC ............ *G10L 19/0216* (2013.01); *G06N 3/08* (2013.01); *G10L 21/0272* (2013.01); *G10L 25/30* (2013.01)

(58) Field of Classification Search
CPC ............ G10L 19/0216; G10L 21/0272; G10L 25/30; G10L 25/18; G06N 3/08; G06N 3/045
See application file for complete search history.

(56) References Cited

U.S. PATENT DOCUMENTS

| 11,355,134 | B2* | 6/2022 | Miner | G06N 3/08 |
|---|---|---|---|---|
| 11,521,630 | B2 | 12/2022 | Miner | |
| 2010/0042408 | A1* | 2/2010 | Malah | G10L 21/038 704/E21.001 |
| 2017/0061978 | A1* | 3/2017 | Wang | G10L 21/0232 |
| 2017/0337939 | A1* | 11/2017 | Bilobrov | G10L 25/54 |
| 2018/0018553 | A1 | 1/2018 | Bach et al. | |
| 2018/0061439 | A1* | 3/2018 | Diamos | G10L 15/183 |
| 2018/0336880 | A1 | 11/2018 | Arik et al. | |
| 2019/0043516 | A1* | 2/2019 | Germain | G10L 15/16 |

(Continued)

OTHER PUBLICATIONS

U.S. Appl. No. 17/062,253, Non-Final Rejection, Dec. 7, 2020, 10 pgs.

(Continued)

*Primary Examiner* — Michael N Opsasnick
(74) *Attorney, Agent, or Firm* — Kwan & Olynick LLP (57) ABSTRACT

A method, system, and computer readable medium for decomposing an audio signal into different isolated sources. The techniques and mechanisms convert an audio signal into K input spectrogram fragments. The fragments are sent into a deep neural network to isolate for different sources. The isolated fragments are then combined to form full isolated source audio signals.

20 Claims, 8 Drawing Sheets

(56) References Cited

U.S. PATENT DOCUMENTS

| | | | | |
|---|---|---|---|---|
| 2019/0066713 | A1* | 2/2019 | Mesgarani | G10L 17/26 |
| 2019/0197121 | A1 | 6/2019 | Jeon et al. | |
| 2019/0318754 | A1* | 10/2019 | Le Roux | G06N 3/044 |
| 2019/0318755 | A1* | 10/2019 | Tashev | G06N 3/045 |
| 2020/0334526 | A1 | 10/2020 | Li et al. | |
| 2021/0034335 | A1* | 2/2021 | Svyatkovskiy | G06N 3/088 |
| 2021/0035590 | A1 | 2/2021 | Miner | |
| 2022/0108711 | A1 | 4/2022 | Miner | |

OTHER PUBLICATIONS

U.S. Appl. No. 17/061,799, Non Final Office Action mailed Mar. 10, 2022, 11 pgs.

U.S. Appl. No. 17/062,253, Advisory Action mailed Jul. 7, 2021, 3 pgs.

U.S. Appl. No. 17/062,253, Examiner Interview Summary mailed Jan. 12, 2021, 2 pgs.

U.S. Appl. No. 17/062,253, Examiner Interview Summary mailed Jun. 7, 2021, 2 pgs.

U.S. Appl. No. 17/062,253, Final Office Action mailed May 10, 2021, 10 pgs.

U.S. Appl. No. 17/062,253, Non-Final Office Action mailed Oct. 22, 2021, 11 pgs.

U.S. Appl. No. 17/062,253, Notice of Allowance mailed Feb. 28, 2022, 6 pgs.

U.S. Appl. No. 17/062,253, Notice of Allowance mailed, Feb. 8, 2022, 9 pgs.

U.S. Appl. No. 17/061,799, USPTO e-Office Action: NOA—Corrected Notice of Allowance and Fees Due (Ptol-85), Oct. 5, 2022, 7pages.

U.S. Appl. No. 17/061,799, USPTO e-Office Action: NOA—Notice of Allowance and Fees Due, Sep. 21, 2022, 9 pages.

* cited by examiner

DEEP LEARNING SEGMENTATION OF AUDIO USING MAGNITUDE SPECTROGRAM

CROSS-REFERENCE TO RELATED APPLICATIONS

This application is a continuation of U.S. patent application Ser. No. 17/062,253, titled "DEEP LEARNING SEGMENTATION OF AUDIO USING MAGNITUDE SPECTROGRAM," by Luke Miner, filed Oct. 2, 2020, which is a continuation of U.S. patent application Ser. No. 17/061,799, titled "DEEP LEARNING SEGMENTATION OF AUDIO USING MAGNITUDE SPECTROGRAM," by Luke Miner, filed Oct. 2, 2020, which claims the benefit of prior U.S. Provisional Application No. 62/882,317, filed Aug. 2, 2019, titled "DEEP LEARNING SEGMENTATION OF AUDIO USING MAGNITUDE SPECTROGRAM" by Luke Miner, all of which are herein incorporated by reference in their entirety for all purposes.

TECHNICAL FIELD

Aspects of the present disclosure relate generally to computer networks, and more particularly, to artificial intelligence.

BACKGROUND

Music has become an integral part of daily life. People generally enjoy music while performing routine activities like driving or working. Often times, it may be desirable to learn how to play a particular instrument featured in a song, or to sing along with the vocals. However, finding sheet music for a particular song can prove difficult. In addition, many people learn better through listening to isolated tracks and playing along, rather than through reading sheet music. However, finding isolated tracks for a particular song can also be cumbersome because isolated instrument/vocal tracks may not be publicly available for certain songs.

Audio segmentation is the decomposition of an audio signal into its component sound sources. In the context of music, this might be splitting the vocals, drums, guitar, and bass out of a song. In non-musical contexts, it could be separating out various people talking in a room from each other and from the background noise, which is also known as the cocktail party problem. Common techniques for audio segmentation include a variety of deficiencies. For example, common techniques can lead to inefficient segmentation, require human intervention, be imperfect due to noise, or be computationally expensive to implement. Thus, there is a need for an effective way to automatically decompose an audio signal into component parts.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

Aspects of the present disclosure relate to methods, systems, and computer readable media for decomposing an audio signal into component parts. The method includes first loading an audio file into a waveform. The waveform is then transformed into a complex spectrogram. The complex spectrogram is then decomposed into a magnitude spectrogram and a phase spectrogram. The magnitude spectrogram is then split into K small fragments. Each of the K fragments is sent through one or more deep neural networks to produce N sequences of K masks, where N corresponds to the number of sources that need to be segmented. For each source, the mask fragments are concatenated together in order to form a complete mask, which is the same length as the original magnitude spectrogram. Also for each source, the complete mask is multiplied with the original magnitude spectrogram to create a new magnitude spectrogram corresponding to the source. Last for each source, the new magnitude spectrogram is combined with the original phase spectrogram to produce a new complex spectrogram corresponding to the source. Next, the new complex spectrograms are transformed into final waveforms. Last, each waveform is encoded and stored to a separate file.

In some embodiments, instead of combining the new magnitude spectrogram with the original phase spectrogram, a multi-channel wiener filter is applied to the new magnitude spectrograms, using the original complex spectrogram as an input, in order to produce the new complex spectrograms. In some embodiments, transforming the complex spectrogram into the waveform is done via a short-time fourier transform and transforming new complex spectrograms into final waveforms is done via computing an inverse short time fourier transform. In some embodiments, a separate deep neural network is used for each individual source. In some embodiments, at least one of the one or more deep neural networks includes an input scale layer before a series of down sample layers and an output scale layer following a series of up sample layers. In some embodiments, at least one of the one or more deep neural networks includes a bridge layer comprising first convolution 2D layer and a second convolution 2D layer and an attention layer. In some embodiments, instead of combining the new magnitude spectrogram with the original phase spectrogram, a new phase is constructed from the new source using a generative adversarial neural network. In some embodiments, instead of combining the new magnitude spectrogram with the original phase spectrogram, a new phase is constructed from the new source using the Griffin-Lim algorithm. In some embodiments, instead of concatenating the mask fragments together and multiplying the complete mask with the original magnitude spectrogram, each mask fragment is multiplied with its corresponding magnitude spectrogram fragment thereby producing a fragment of the new magnitude spectrogram. In some embodiments, the fragments of the new magnitude spectrogram are then appended to produce the complete magnitude spectrogram.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The disclosure may best be understood by reference to the following description taken in conjunction with the accompanying drawings, which illustrate particular embodiments of the present disclosure. In the description that follows, like parts are marked throughout the specification and drawings with the same numerals, respectively. The drawing figures are not necessarily drawn to scale and certain figures may be shown in exaggerated or generalized form in the interest of clarity and conciseness.

DETAILED DESCRIPTION

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular interlocking parts. However, it should be noted that the techniques of the present disclosure apply to various other parts. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of wires, circuits, bridges and other features or elements may reside between the processor and memory. Consequently, a connection does not necessarily mean a direct, unimpeded connection unless otherwise noted. As used herein, the term "convolution" and "convolutional" will be used interchangeably.

Figure 1:
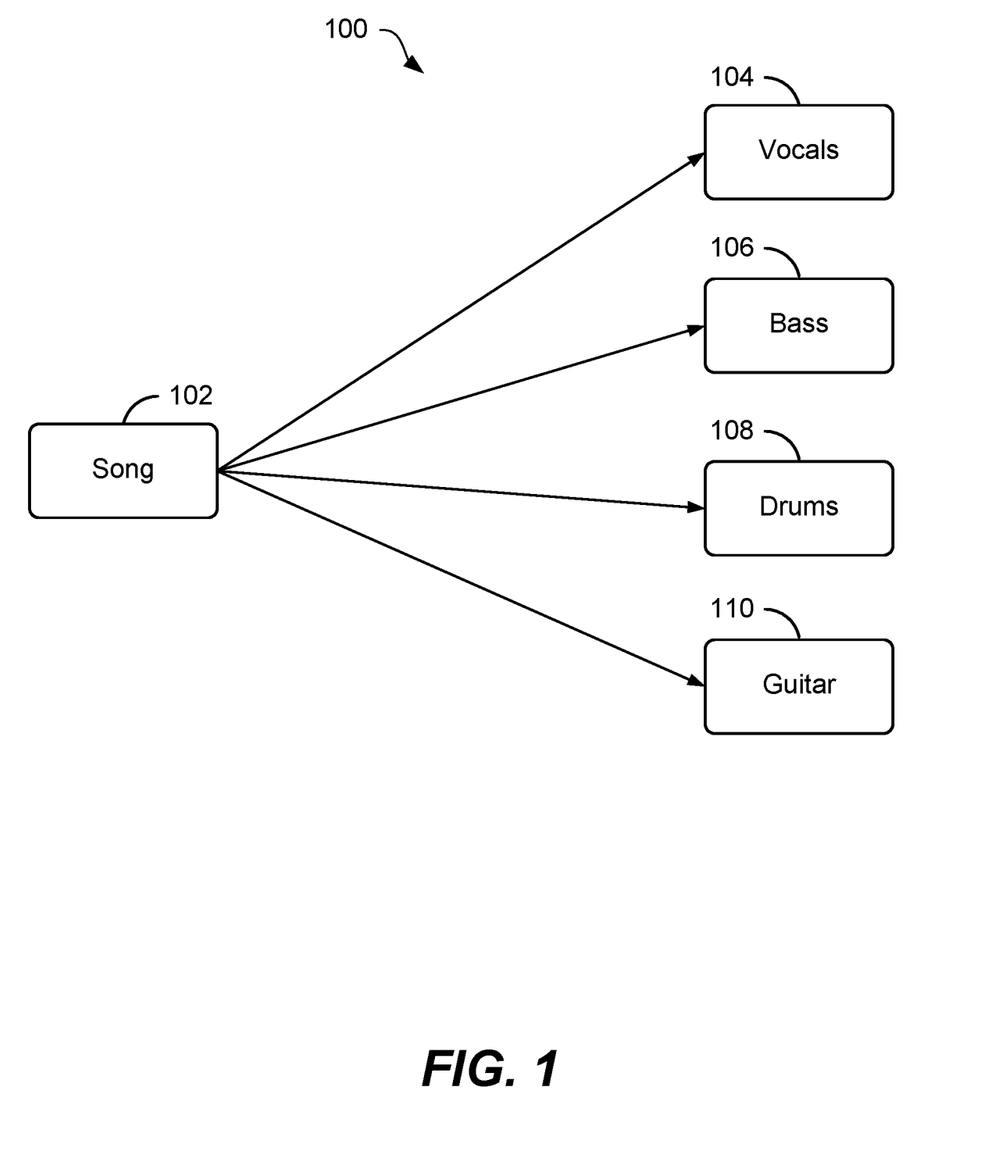
FIG. 1 is a representative view of an example audio file decomposed into component parts, in accordance with embodiments of the present disclosure.

FIG. 1 is a representative view 100 of an example audio file decomposed into component parts, in accordance with embodiments of the present disclosure. View 100 shows an audio signal or file 102, comprised of a plurality of component parts. In some embodiments, audio signal or file 102 is any audio source or signal, such as a song. FIG. 1 illustrates audio signal 102 being broken into a plurality of sources 104, 106, 108, and 110. In the case of FIG. 1, song 102 is broken down into four component parts, vocals 104, bass 106, drums 108, and guitar 110. However, in some other examples, the number of component parts can be more or less than four. While FIG. 1 shows audio file 102 being a song, in other examples, audio file 102 can be any other sound file, such as a recording of a group of people's voices. In such an example, component parts 104-110 would then be each individual voices that make us the group.

In some embodiments, audio file 102 is a composite of all component parts 104-110. In some embodiments, audio file 102 can be created by separately recording each component part, or source, 104-110 and then combining them together. In such embodiments, separate isolated audio tracks for each component part, or source, are readily available, since they were recorded separately. However, in other embodiments, audio file 102 is recorded/created as one audio file and separate tracks for each component part is not available or cannot easily be isolated. Thus, techniques and mechanisms of the present disclosure provide a solution for isolating individual source/component parts of such audio files.

Figure 2A:
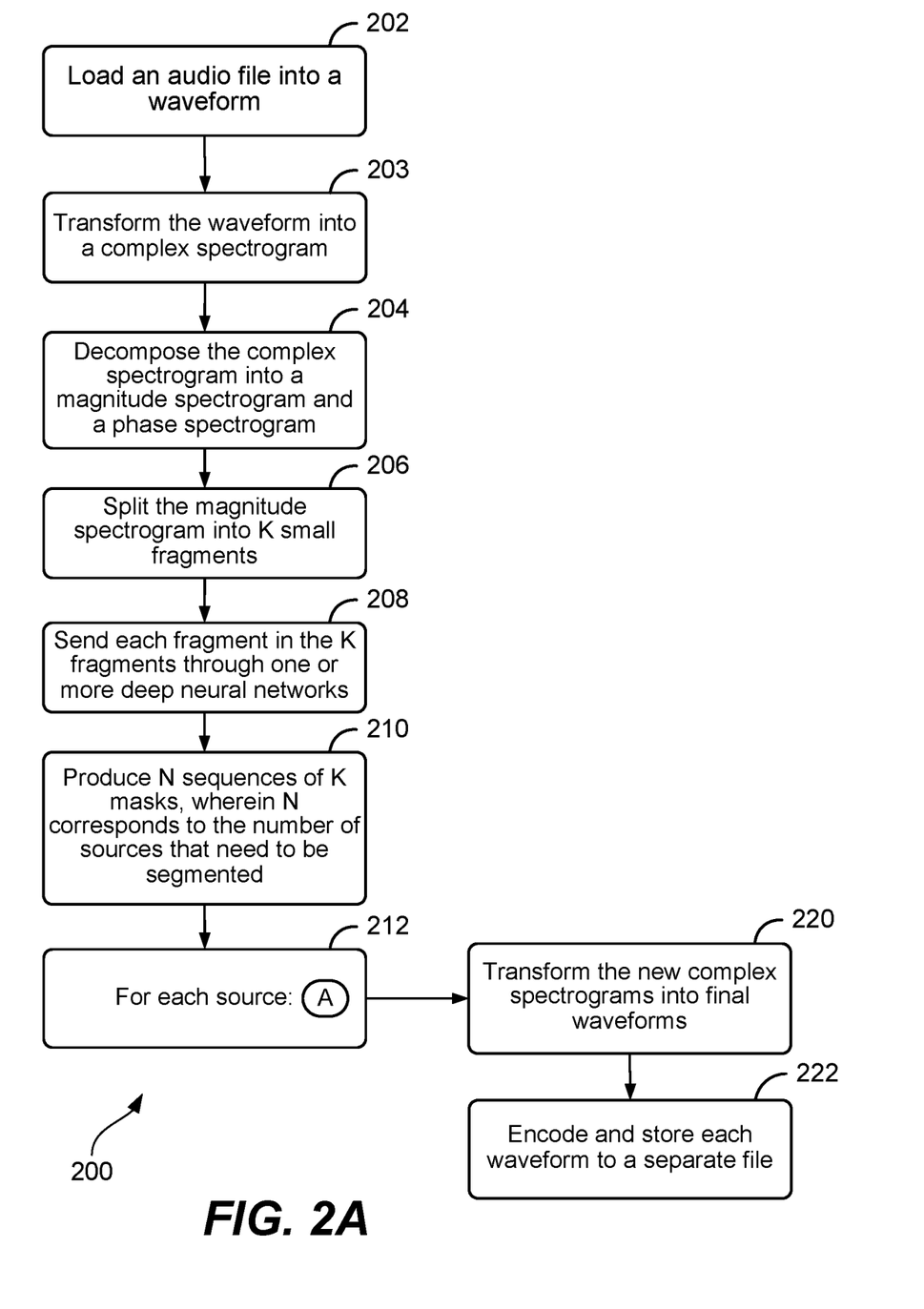
FIGS. 2A-2B illustrate a flow chart depicting a method for decomposing an audio signal into component parts, in accordance with embodiments of the present disclosure.
Figure 2B:
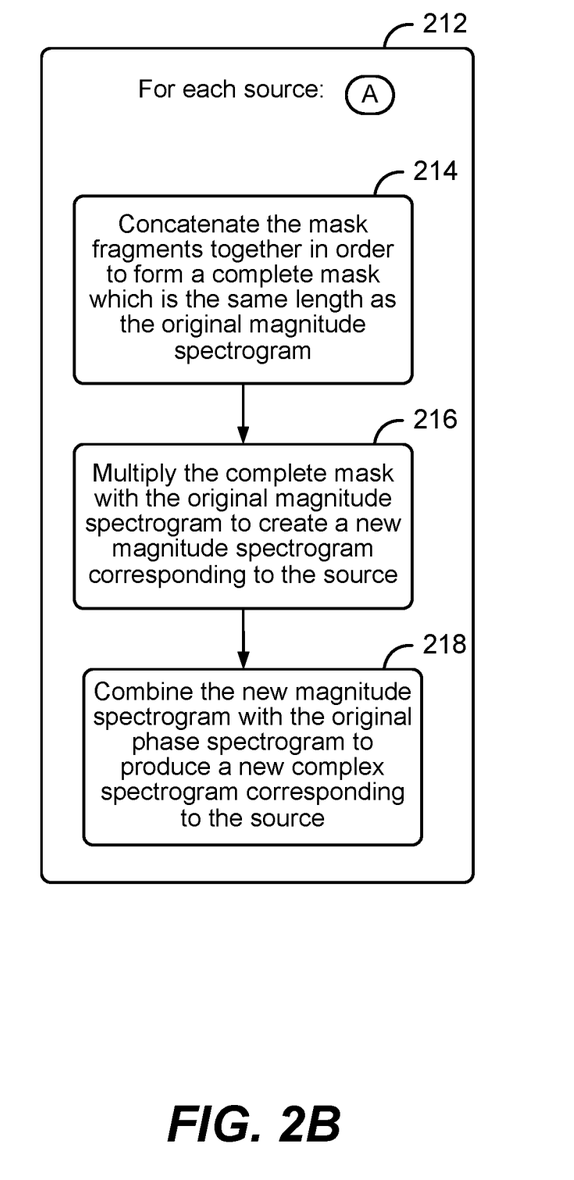
Figure 3:
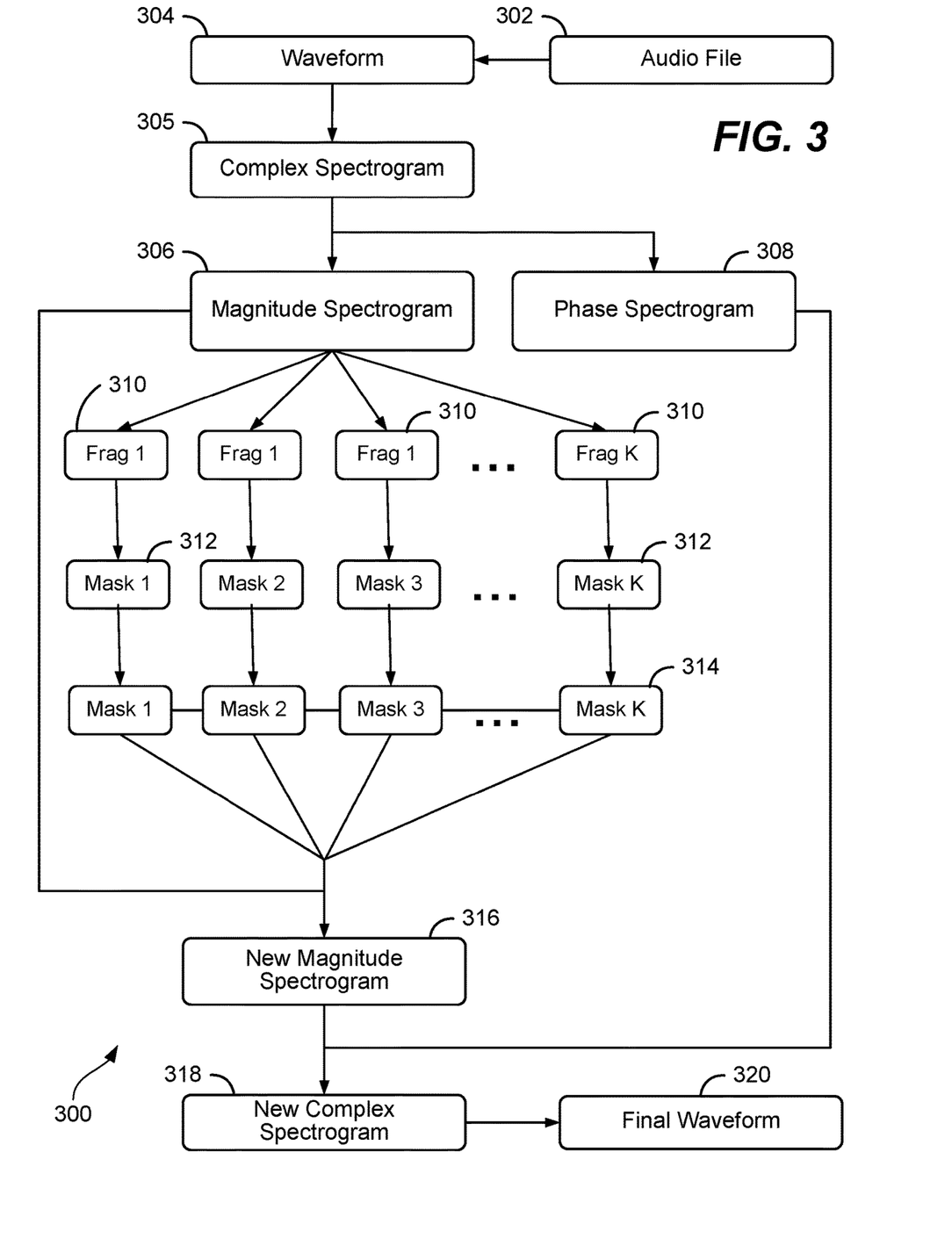
FIG. 3 is a representative view of states of transformation of an example method for decomposing an audio signal into component parts, in accordance with embodiments of the present disclosure.

FIGS. 2A-2B illustrate a flow chart depicting a method 200 for decomposing an audio signal into component parts, in accordance with embodiments of the present disclosure. FIG. 3 is a representative view of states of transformation 300 of example method 200 for decomposing an audio signal into component parts, in accordance with embodiments of the present disclosure. For the purposes of this disclosure, FIG. 2 will be described in conjunction with FIG. 3.

At 202, an audio file 302 is loaded into a waveform 304. In some embodiments, audio file 302 is a multi-channel audio file, such as a song or an MP3. In some embodiments, instead of a multi-channel source, audio file 302 is a monophonic source that is loaded into a waveform 304. In some embodiments, waveform 304 is represented as a floating-point time series. In other words, in such embodiments, for each instant of time, the wave has a value expressed as a decimal point. At 203, waveform 304 is transformed into a complex spectrogram 305. In some embodiments, waveform 304 is transformed via a short-time fourier transform. At 204, complex spectrogram 305 is then decomposed into a magnitude spectrogram 306 and a phase spectrogram 308. At 206, magnitude spectrogram 306 is split into K small fragments 310. At 208, each fragment 310 of magnitude spectrogram 306 is sent through one or more deep neural networks. At 210, the deep neural network produces N sequences of K masks 312 corresponding to the N sources that need to be segmented. In some embodiments, the masks are used to extract individual parts/components from a mixed audio signal. Each mask or sequence of masks corresponds to a different source. In some embodiments, the masks are binary masks, with pixels being either 0 or 1. In some embodiments, a mask is combined with a magnitude spectrogram of the same dimension, which represents a full mix. In some embodiments, the light portions of the mask (represented by 1s) correspond to the portions of the mix that will be extracted. In such embodiments, the black portions of the mask (represented by 0s) correspond to the portions of the extracted spectrogram that will be blank. In some embodiments, a separate deep neural network is used for each individual source. In some embodiments, a single neural network is used for producing every N sequence of K masks 312. In some embodiments, the N sequences of K masks 312 are produced using any number of trained neural networks.

At 212, a determination is made as to whether all sources have been processed. If yes, then method 200 proceeds to step 220, described in detail below. If not, then a loop function is performed for each source N, depicted as steps 214 through 218. At 214, mask fragments 312 are concatenated together in order to form a complete mask 314 which is the same length as original magnitude spectrogram 306. At 216, complete mask 314 is multiplied with original magnitude spectrogram 306, creating a new magnitude spectrogram 316 corresponding to the source associated with the current loop. At 218, new magnitude spectrogram 316 is combined with original phase spectrogram 308 to produce a new complex spectrogram 318 corresponding to the isolated source associated with the current loop.

In some embodiments, rather than steps 216 and 218, each mask fragment is multiplied with its corresponding magnitude spectrogram fragment producing a fragment of the new magnitude spectrogram. These fragments are then appended to produce the complete new magnitude spectrogram 316. In some embodiments, at the end of step 218, the loop function loops back to step 212, where a determination is made as to whether all sources have been processed. If yes, then method 200 proceeds to step 220. If not, then another source is chosen and the method proceeds through the loop function once again.

Once a determination has been made that all sources have been processed, method 200 proceeds to step 220. At 220, new complex spectrograms 316 are transformed into final waveforms 320. In some embodiments, producing final waveforms 320 is done via computing an inverse short time fourier transform. In some embodiments, rather than combining with the original phase, a new phase is constructed from the new source using a generative adversarial neural network. In some embodiments, rather than combining with the original phase, a new phase is constructed from the new source using the Griffin-Lim algorithm.

In some embodiments, instead of combining new magnitude spectrograms with original phase spectrogram 308, a multi-channel wiener filter is applied to new magnitude spectrogram 316, using original complex spectrogram 305 as input, in order to produce new complex spectrogram 318. In some embodiments, applying the wiener filter ultimately results in final waveforms with less interference and artifacts. At 222, each waveform is encoded and saved to a separate file. In some embodiments, the final waveforms are simply returned and/or played but not saved.

In some embodiments, a user may only be interested in a single component or source of original audio file 302. In such embodiments, method 200 would be slightly modified to isolate for a single source. For example, in step 210, instead of producing N sequences of K masks, method 200 only produces one sequence of K masks. In addition, in such embodiments, modified method 200 would not include a loop function 212, but instead would just proceed directly through steps 216-218 from 210 because there is no need to consider other sources.

Figure 4:
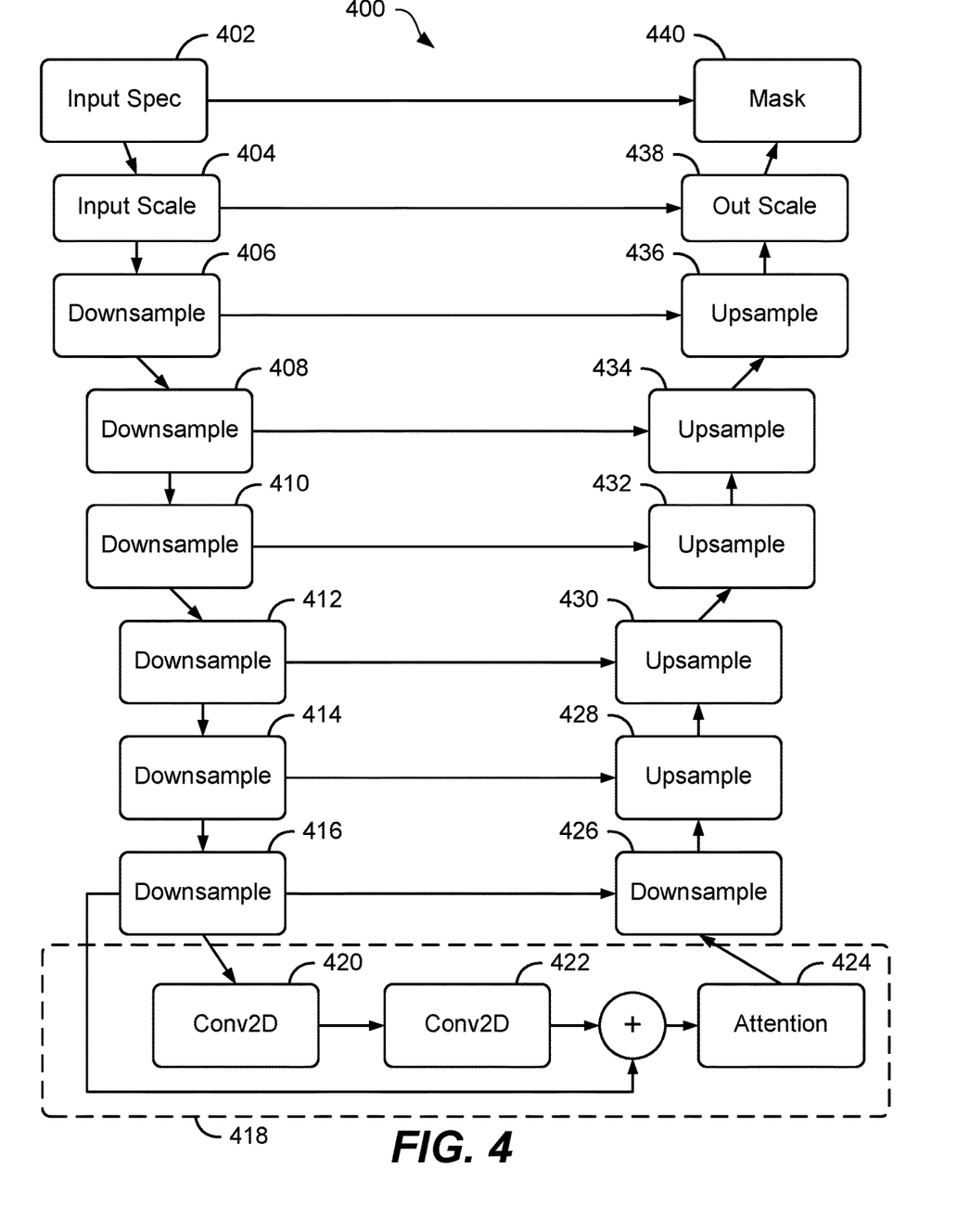
FIG. 4 is a representative view of an example neural network architecture, in accordance with embodiments of the present disclosure.

As mentioned in steps 208 and 210, one or more neural networks is used to produce the mask fragments. FIG. 4 is a representative view of an example neural network architecture 400, in accordance with embodiments of the present disclosure. Neural network 400 takes in input spectrogram 402, and outputs mask 440, using a downward path and an upwards path. In some embodiments, each layer in neural network 400 creates a set of feature map or output tensor(s). In some embodiments, downsample layers create feature maps of smaller dimensions, but increases the number of feature maps. In some embodiments, upsample layers create feature maps of larger dimensions, but decreases the number of feature maps.

In some embodiments, input spectrogram 402 is a fragment of an original entire magnitude spectrogram. In some embodiments, input spectrogram 402 is an entire magnitude spectrogram, meaning, an input spectrogram corresponding to an entire song. In some embodiments, input spectrogram 402 comprises three dimensions. In some embodiments, the first dimension is time, the second dimension is frequency, and the third dimension is a channels dimension.

In some embodiments, input spectrogram 402 is first passed through an input layer 404. In some embodiments, input layer 404 is a batch normalization layer that speeds convergence during training also increases performance during inference. In some embodiments, input layer 404 is trained to center the values of the input spectrogram around zero with a standard deviation of 1. In some embodiments, for each frequency bin of the input, there is a mean value and a standard deviation, both derived over random samples of training datasets. In some embodiments, input layer 404 will subtract the value in each frequency bin by the mean value and divide it by the standard deviation so that the value is centered around zero. In some embodiments, as neural network 400 is trained, the mean and the standard deviation changes/adjusts over time to be more optimized values.

In some embodiments, after input scale layer 404 is a downsample layer 406. In some embodiments, downsample layer 406 cuts the values of the first two dimensions, e.g., time and frequency, in half in order to "zoom out" of the input data for recognition of features. In some embodiments, downsample layer 406 also increases the third dimension in order to increase the capacity of neural network 400 to account for shrinking the first two dimensions. The purpose of downsample layer 406 is to provide a coarser view of the input data such that dependencies that are farther apart can be seen more easily captured. In some embodiments, neural network 400 includes five more downsample layers 408, 410, 412, 414, and 416 after initial downsample layer 406, with each successive downsample layer providing a coarser and coarser view of the input data. In some embodiments, the series of downsample layers is trained to develop features for understanding differences in data with greater distances. In some embodiments, the number of downsample layers that provides the most optimal outcome for neural network 400 is six. Through repeated experimentation, it was discovered that for audio signal decomposition, architectures with less than six downsample layers provided insufficiently accurate outcomes, at least in terms of certain metrics, e.g., signal to distortion ratio (SDR), source image to spatial distortion ratio (ISR), signal to interference ratio (SIR), and signal to artifacts ratio (SAR). In some embodiments, SDR can be thought of as an overall quality metric, while SIR and ISR can be thought of as the quality of the separation of the audio signal into sources metric, and SAR can be thought of as a measure of the artifacts introduced in the process. In addition, it was also empirically discovered that more than six downsample layers provided marginally better quality, but required much more computational and resource cost (for example, seven downsample layers increases required memory size by four times as compared to six downsample layers), thus rendering the increase in quality to be not worth the cost.

In some embodiments, after the downsample layers, neural network 400 includes a bridge layer 418. In some embodiments, bridge layer 418 includes a first convolutional 2D layer 420, a second convolutional 2D layer 422, and an attention layer 424. In some embodiments, each convolutional 2D layer provides a non-linear consolidation of information in the input tensor. The stacking of the convolutional 2D layers allows for a hierarchical decomposition of the input. However, each time the input data goes through a convolutional 2D layer, the output is distorted. Thus, to account for the distortion, the input to first convolutional 2D layer 420 is then added to the output of second convolutional 2D layer 422 in order to ensure that at least some of the information in the original input to bridge layer 418 gets passed through to attention layer 424. In some embodiments, attention layer 424 informs neural network 400 which pixels are most important and need to be focused on. In some embodiments, bridge layer 418 works to squeeze as much information as possible out of the zoomed out view of the input data.

In some embodiments, the output of attention layer 424 is then inputted into upsample layer 426. In some embodiments, upsample layers are opposite of downsample layers. In other words, upsample layers provide a "zoom in" view of input data by increasing the first two dimensions and shrinking the third dimension. As with the series of downsample layers, neural network 400 also has 5 more upsample layers 428, 430, 432, 434, and 436 after initial upsample layer 426 that correspond to the different downsample layers previously described. In some embodiments, each upsample layer has a corresponding downsample layer with equivalent dimensions.

In some embodiments, the output of each upsample layer is concatenated to the output of each corresponding downsample layer. For example, the output of downsample layer 426 is concatenated with the output to downsample layer 416, which has the same dimensions. As with bridge layer 418, an output to an upstream layer is concatenated with the output of a more downstream layer, via a skip connection, in order to recapture any information that might have been lost during progression through the layers. In such embodiments, after concatenation, the first two dimensions of the concatenated output remain the same, but the third dimension is doubled.

In some embodiments, after the sixth upsample layer 436, the output is passed through an output scale 438. In some embodiments, output scale 438 is just the reverse of input scale 404. In such embodiments, a mean value is added to frequency bin values and multiplied by a standard deviation, where the mean and standard deviations are also learned over time via training neural network 400. In other words, input scale 404 "normalizes" the values of the frequency bins and output scale 438 "un-normalizes" them.

In some embodiments, the output of output scale 438 is then inputted into mask layer 440. In some embodiments, mask layer 440 is a rectilinear layer. In some embodiments, the output to mask layer 440 is then multiplied by input spectrogram 402, thereby producing a "mask" or a "mask fragment." For example, if input spectrogram 402 was a fragment of an actual song, or the spectrogram version of an actual song, then the mask or mask fragment would correspond with only an isolated component/source of the actual song fragment, such as vocals.

In some embodiments, neural network architecture 400 takes in only fragments of audio input spectrograms and outputs mask fragments corresponding to a single source, which are later concatenated. In some embodiments, neural network 400 takes in an entire audio input spectrogram corresponding to a song and outputs an entire mask corresponding to an entire isolated components/source version of the song. In some embodiments, neural network 400 takes fragments as inputs, but outputs an entire mask. In such embodiments, although the input spectrogram are only fragments, the output is an entire mask because the input into the mask layer(s) are stitched together fragments that are first concatenated before being passed through the mask layers. In some embodiments, the convolutional layers can be 1D or 3D, instead of 2D. In some embodiments, one or more linear layers can be added in order to increase complexity. In some embodiments, bridge layer 418 can comprises just sequential convolutional layers without adding the original bridge layer input and without attention layer 424.

In some embodiments, as with many neural networks, neural network 400 operates in two modes: a training mode and an inference mode. The training mode is for training the neural network to work sufficiently in the inference mode. In training mode, training data sets are sent through the neural network and the results are compared to known/correct results. In the case of songs, a training data set could be a song whose vocal tracks are readily available, such as readily available stems. In some embodiments, only the stems are available, and the "original song" is created by combining all the readily available stems. In some embodiments, the song is sent through the neural network using the methods disclosed herein, such as method 200, and the resulting mask is applied to the original song. The result of the mask application is then compared to the actual vocal tracks, such as the readily available stems. The neural network is configured to recognize differences between its training output and the correct/known results, and its parameters will be adjusted accordingly. Then another training data set/song is passed through the neural network and the process repeats itself for many cycles, called epochs, until there is little to no difference between neural network output and the correct/known results.

In some embodiments, an additional extra step during training can be implemented in order to speed up training and improve accuracy. In such embodiments, a random starting point in the audio file or song is randomly selected. Then, the audio file or song is truncated such that any portion after the starting point is kept and any point before the starting point is discarded. Then the training method proceeds by progressing through the steps laid out in method 200. In such embodiments, the purpose of randomly picking a start point in the audio file and truncating is to introduce more randomness into the training data set. That way, the neural network is more likely to end up with different chunks every iteration of the training cycle, or epoch. This is because the system can randomly truncate at the beginning of each training epoch. Otherwise, the neural network can end up with the same chunks even if they are in different order. In such embodiments, such a pre-training step is an optimization step to improve the accuracy of the neural network.

Figure 5:
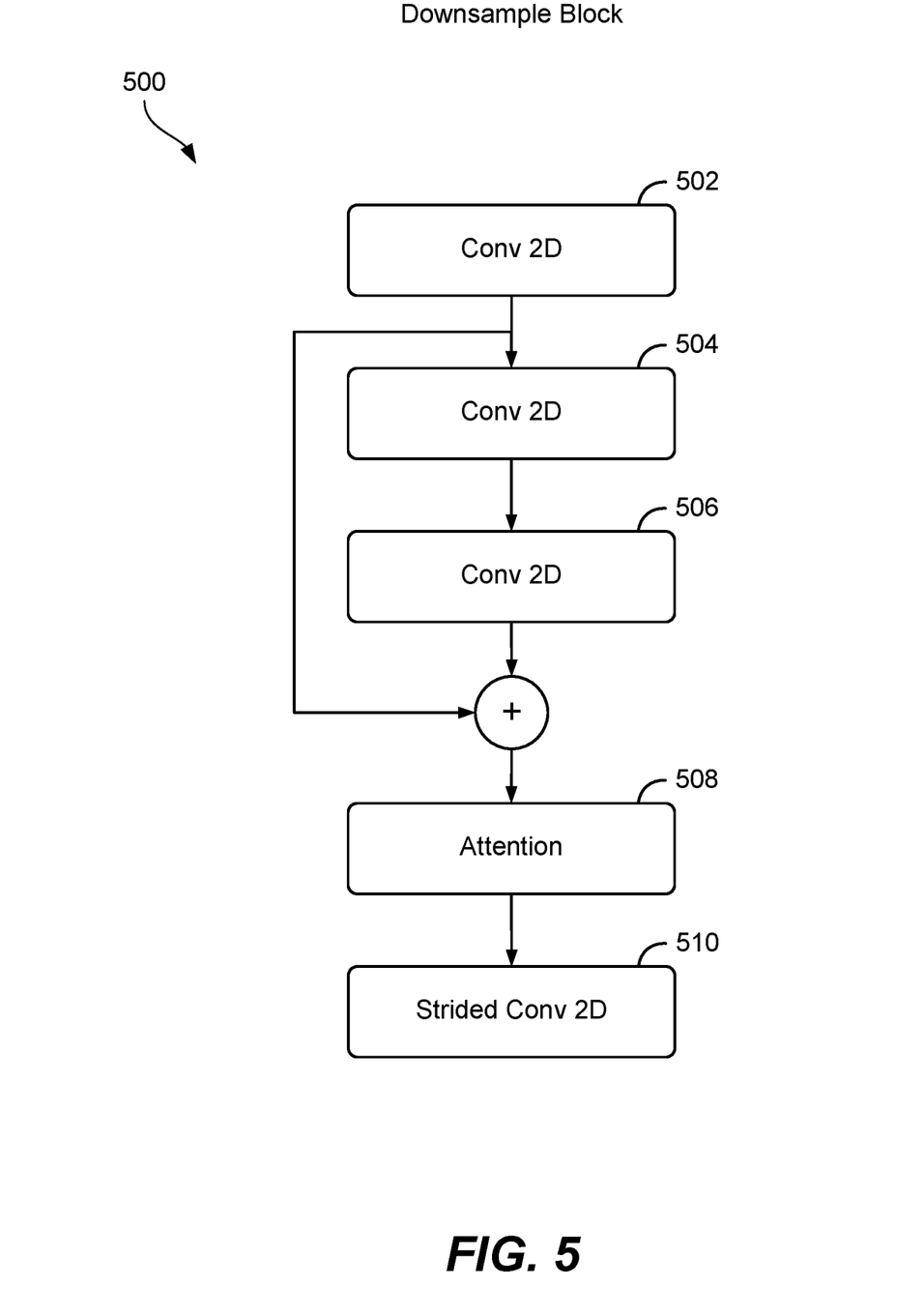
FIG. 5 is a representative view of an example downsample block, in accordance with embodiments of the present disclosure.

FIG. 5 is a representative view of an example downsample block 500, in accordance with embodiments of the present disclosure. Downsample block 500 includes three convolution layers 502, 504, and 506. In some embodiments, the convolution layers are convolution 2D layers. In some embodiments, an input tensor is inputted into first convolution layer 502. The output of convolution layer 502 is then fed into second convolution layer 504. The output of convolution layer 504 is then fed into third convolution layer 506. Next, the output of convolution layer 506 is then added with either the input to first convolution layer 502 or the output of first convolution layer 502. Through experimentation, it was discovered that adding the output of first convolution layer 502 to the output of third convolution layer 506 resulted in more improvements in SDR metrics than adding the input to first convolution layer 502.

In some embodiments, after the output of third convolutional layer 506 is added to the output of first convolutional layer 502, the combined output is then fed into an attention layer 508. In some embodiments, the output of attention layer 508 is then fed to a strided convolutional layer 510. In some embodiments, strided convolutional layer 510 is a stride 2 convolutional layer. This allows for the shrinking of the size of certain dimensions in the input tensor to yield an output tensor with smaller dimensions. In some embodiments, one or more of the convolutional layers use padding to make the size of the output consistent.

Figure 6:
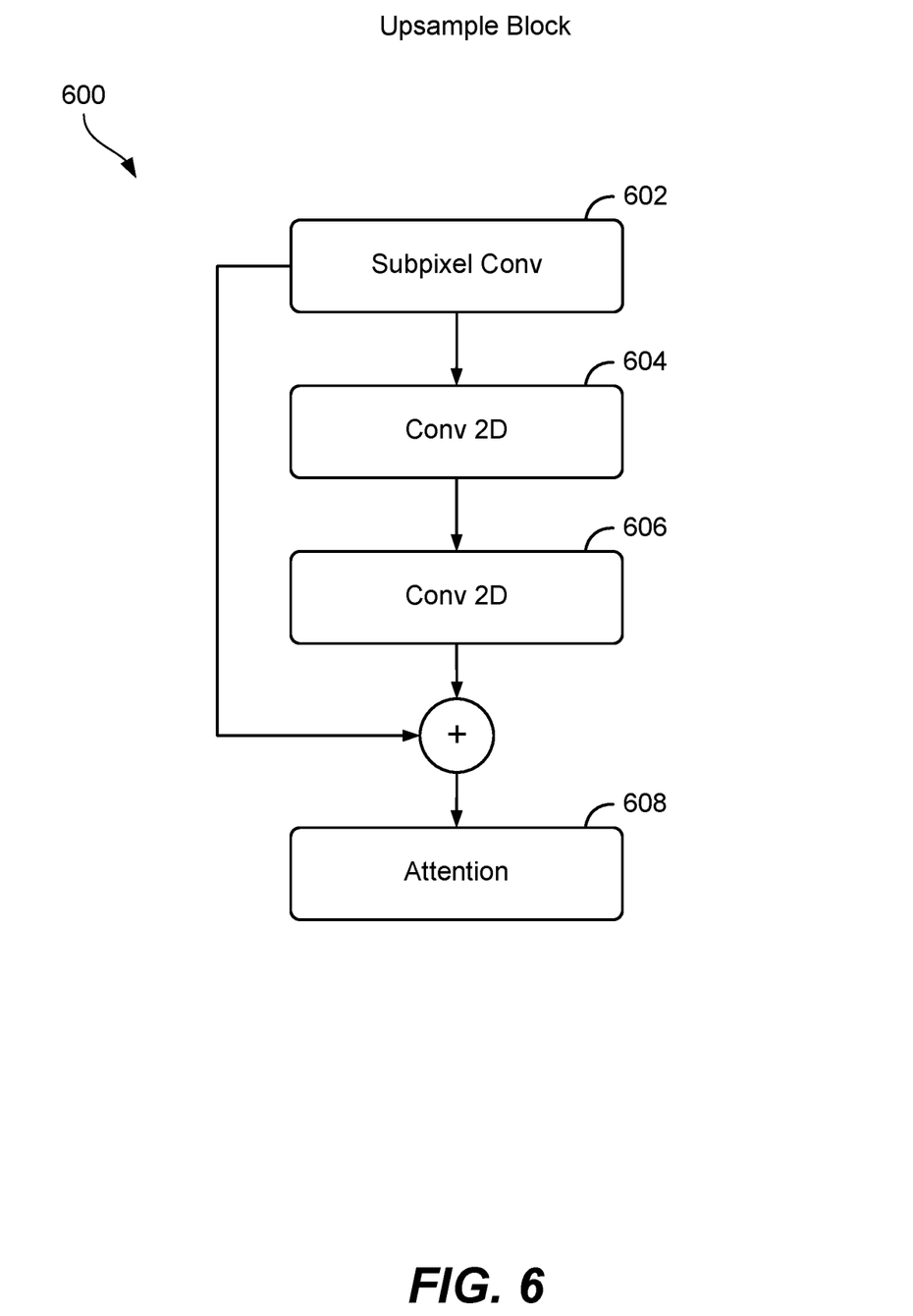
FIG. 6 is a representative view of an example upsample block, in accordance with embodiments of the present disclosure.

FIG. 6 is a representative view of an example upsample block 600, in accordance with embodiments of the present disclosure. Upsample block 600 includes a subpixel convolutional layer 602. In some embodiments, subpixel convolution layer 602 can be a transpose convolutional layer. However, subpixel convolutions work better than normal transpose convolutions. This is because instead of zeros used for padding in a normal transpose convolution, the padding in a subpixel convolution is derived using a pixel shuffle/reshape operation, which produces less artifacts and is more computationally efficient. In some embodiments, the output of transpose convolution layer 602 is then fed into a first convolutional layer 604. Then, the output of first convolution layer 604 is then fed into a second convolution layer 606. In some embodiments, at least one of the convolution layers is a convolutional 2D layer. In some embodiments, the output of second convolution layer 606 is then added to the output of transpose convolution layer 602 before feeding into attention layer 608. In some embodiments, the input to subpixel layer 602 can be added to the output of second convolution layer 606. However, through experimentation, using the output of subpixel convolution layer 602 resulted in more improvement in SDR metrics (better quality).

The systems and techniques presented provide many technical advantages and improvements to current technology. For example, the introduction of the customized bridge layer provides reductions to interference as compared to similar technology. As another example, inserting attention layers in the precise locations as presented above has empirically shown to reduce artifacts. Last, the placement of the input scale and output scale layers has been empirically shown to speed up and improve model convergence for audio segmentation.

The systems and techniques presented in this disclosure provide many real world applications and benefits. For example, the systems and techniques of the present disclosure allow for remixing of live or old recordings for which stems are not available. In addition, the systems and techniques of the present disclosure also allow for the creation of karaoke versions of songs without the need for the original stems. Further, the systems and techniques of the present disclosure also allow for the creation of movie soundtrack versions of songs without the need for the original stems. In addition, the systems and techniques of the present disclosure also allow for the isolation of particular instruments in order to facilitate further work such as transcription. The systems and techniques of the present disclosure also allow for the automatic identification of the instruments and vocals of a song without the need for explicit labeling. The systems and techniques of the present disclosure can also be helpful for remixing old or live recordings, allowing adjusting and readjusting of levels of certain instruments.

The benefits of the present disclosure are not simply limited to just music. The systems and techniques of the present disclosure also allow for the isolation of distinct voices from a noisy background. It is also useful for picking out faint voices in recordings that are difficult to make out over other audio sources.

Figure 7:
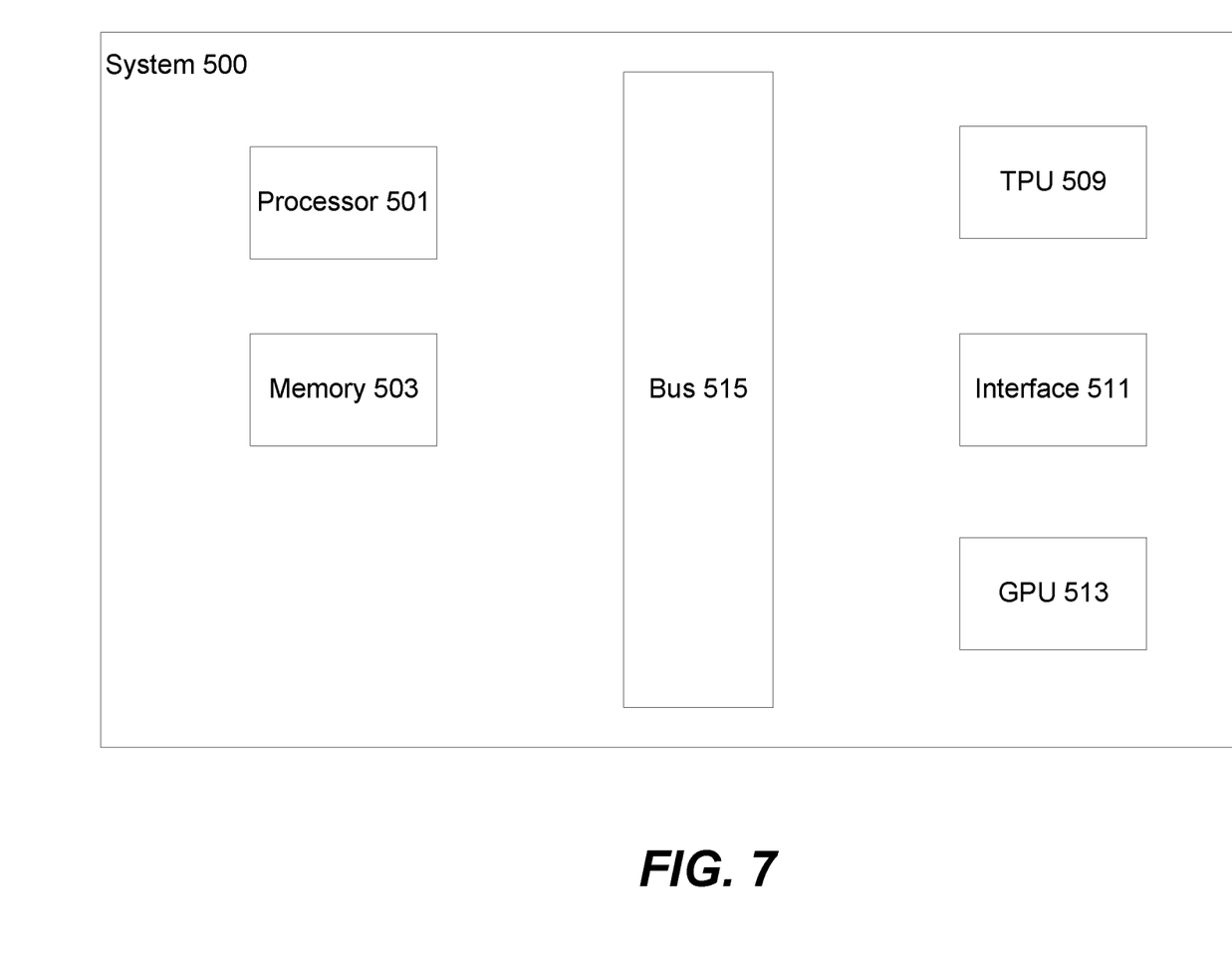
FIG. 7 illustrates one example of a system, in accordance with embodiments of the present disclosure.

FIG. 7 illustrates one example of a system 700, in accordance with one or more embodiments. According to particular embodiments, a system 700, suitable for implementing particular embodiments of the present disclosure, includes a processor 701, a memory 703, an interface 711, and a bus 715 (e.g., a PCI bus or other interconnection fabric) and operates as a streaming server. In some embodiments, when acting under the control of appropriate software or firmware, the processor 701 is responsible for processing inputs through various computational layers and algorithms, such as down sample layers and up sample layers. In other embodiments, the processor is responsible for updating the parameters of each computational layer within the deep learning model. Various specially configured devices can also be used in place of a processor 701 or in addition to processor 701. The interface 711 is typically configured to send and receive data packets or data segments over a network. In addition, in some embodiments, system 700 can also include a specialized processor TPU 709, in order to facilitate machine learning, and/or a specialized processor GPU 713 for implementing a cloud multi-GPU machine.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions for operations including training a neural network, such as method 200. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

The foregoing description of various aspects and examples have been presented for purposes of illustration and description. It is not intended to be exhaustive nor to limit the disclosure to the forms described. The aspects(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A method for isolating a source from an audio signal, the method comprising:
    transforming an audio file into a complex spectrogram;
    decomposing the complex spectrogram into a magnitude spectrogram and a phase spectrogram;
    splitting the magnitude spectrogram into K small fragments along the time dimension;
    sending each fragment in the K small fragments through a convolutional deep neural network to produce K small fragment outputs, wherein the convolutional deep neural network includes convolutional layers augmented with an attention layer to help the convolutional deep neural network find the most informative areas and reduce artifacts in each of the K small fragments, wherein the attention layer informs the convolutional deep neural network of important pixels;
    producing a source mask based on the K small fragment outputs, wherein the source mask corresponds to an audio source targeted to be isolated;
    multiplying the source mask with the magnitude spectrogram to create a new magnitude spectrogram corresponding to the source.

2. The method of claim 1, further comprising combining the new magnitude spectrograms with the phase spectrogram in order to produce a new complex spectrogram.

3. The method of claim 1, wherein transforming the audio file into the complex spectrogram is done via a short-time fourier transform.

4. The method of claim 1, wherein a second deep neural network is used for isolating a second audio source.

5. The method of claim 1, wherein the deep neural network includes an input scale layer before a series of downsample layers and an output scale layer following a series of upsample layers.

6. The method of claim 1, wherein the deep neural network includes a bridge layer comprising a first convolutional 2D layer and a second convolutional 2D layer.

7. The method of claim 1, further comprising constructing a new phase spectrogram from a new source using a generative adversarial neural network.

8. The method of claim 1, further comprising constructing a new phase spectrogram from a new source using the Griffin-Lim algorithm.

9. The method of claim 1, further comprising applying a multi-channel wiener filter to the new magnitude spectrogram.

10. The method of claim 1, wherein the source mask is produced by concatenating the K small fragment outputs.

11. A system for isolating a source from an audio signal, the system comprising:
    a processor; and
    memory storing instructions to cause the processor to execute a method, the method comprising:
        transforming an audio file into a complex spectrogram;
        decomposing the complex spectrogram into a magnitude spectrogram and a phase spectrogram;
        splitting the magnitude spectrogram into K small fragments along the time dimension;
        sending each fragment in the K small fragments through a convolutional deep neural network to produce K small fragment outputs, wherein the convolutional deep neural network includes convolutional layers augmented with an attention layer to help the convolutional deep neural network find the most informative areas and reduce artifacts in each of the K small fragments, wherein the attention layer informs the convolutional deep neural network of important pixels;
        producing a source mask based on the K small fragment outputs, wherein the source mask corresponds to an audio source targeted to be isolated;
        multiplying the source mask with the magnitude spectrogram to create a new magnitude spectrogram corresponding to the source.

12. The system of claim 11, wherein the method further comprises combining the new magnitude spectrograms with the phase spectrogram in order to produce a new complex spectrogram.

13. The system of claim 11, wherein transforming the audio file into the complex spectrogram is done via a short-time fourier transform.

14. The system of claim 11, wherein a second deep neural network is used for isolating a second audio source.

15. The system of claim 11, wherein the deep neural network includes an input scale layer before a series of downsample layers and an output scale layer following a series of upsample layers.

16. The system of claim 11, wherein the deep neural network includes a bridge layer comprising a first convolutional 2D layer and a second convolutional 2D layer.

17. The system of claim 11, wherein the method further comprises constructing a new phase spectrogram from a new source using a generative adversarial neural network.

18. The system of claim 11, wherein the method further comprises constructing a new phase spectrogram from a new source using the Griffin-Lim algorithm.

19. The system of claim 11, wherein the method further comprises applying a multi-channel wiener filter is applied to the new magnitude spectrogram.

20. A non-transitory computer readable medium storing instructions to be executed by a processor, the instructions comprising:
    transforming an audio file into a complex spectrogram;
    decomposing the complex spectrogram into a magnitude spectrogram and a phase spectrogram;
    splitting the magnitude spectrogram into K small fragments along the time dimension;

sending each fragment in the K small fragments through a convolutional deep neural network to produce K small fragment outputs, wherein the convolutional deep neural network includes convolutional layers augmented with an attention layer to help the convolutional deep neural network find the most informative areas and reduce artifacts in each of the K small fragments, wherein the attention layer informs the convolutional deep neural network of important pixels;

producing a source mask based on the K small fragment outputs, wherein the source mask corresponds to an audio source targeted to be isolated;

multiplying the source mask with the magnitude spectrogram to create a new magnitude spectrogram corresponding to the source.

* * * * *